(12) United States Patent
Yamamoto

(10) Patent No.: US 8,459,393 B2
(45) Date of Patent: Jun. 11, 2013

(54) REAR FENDER STRUCTURE FOR MOTORCYCLE AND MOTORCYCLE

(75) Inventor: Takayo Yamamoto, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 434 days.

(21) Appl. No.: 12/699,167

(22) Filed: Feb. 3, 2010

(65) Prior Publication Data
US 2010/0194149 A1    Aug. 5, 2010

(30) Foreign Application Priority Data
Feb. 3, 2009 (JP) .................................. 2009-022782

(51) Int. Cl.
*B62K 11/00* (2006.01)
(52) U.S. Cl.
USPC ......... 180/219; 280/152.2; 280/848; 296/198
(58) Field of Classification Search
USPC ..... 296/198; 180/219; 280/847, 152.1–152.3, 280/848
See application file for complete search history.

(56) References Cited

U.S. PATENT DOCUMENTS

| | | | | |
|---|---|---|---|---|
| 2,675,464 | A | * | 4/1954 | Schwinn ........................ 362/475 |
| 5,533,783 | A | * | 7/1996 | Harms et al. ............. 297/195.13 |
| 6,257,362 | B1 | * | 7/2001 | Scherbarth .................... 180/219 |
| 6,695,330 | B2 | | 2/2004 | Hata |
| 7,641,238 | B2 | | 1/2010 | Fujimoto et al. |
| 7,793,747 | B2 | * | 9/2010 | Brown .......................... 180/219 |
| 2003/0132048 | A1 | | 7/2003 | Hata |
| 2004/0079009 | A1 | * | 4/2004 | Arrua ............................... 40/204 |
| 2004/0124031 | A1 | * | 7/2004 | Tanabe et al. ................. 180/309 |
| 2005/0068781 | A1 | * | 3/2005 | Nakayama et al. ........... 362/473 |
| 2006/0037813 | A1 | * | 2/2006 | Ozeki et al. ................... 181/272 |
| 2006/0180373 | A1 | * | 8/2006 | Hanagan ....................... 180/219 |
| 2007/0046016 | A1 | | 3/2007 | Fujimoto et al. |
| 2009/0079156 | A1 | * | 3/2009 | Ichihara ..................... 280/152.1 |

FOREIGN PATENT DOCUMENTS

| | | |
|---|---|---|
| JP | 56-114984 U | 9/1981 |
| JP | 57057171 U | 4/1982 |
| JP | 59102670 A | 6/1984 |

(Continued)

OTHER PUBLICATIONS

EP Application No. 10152260.5: Extended European Search Report & Opinion for EP 10152260.5 dated Sep. 21, 2011.

(Continued)

*Primary Examiner* — Paul N Dickson
*Assistant Examiner* — Maurice Williams
(74) *Attorney, Agent, or Firm* — Troutman Sanders LLP

(57) ABSTRACT

A rear rear-fender bracket integrally coupled to an upper portion and a lower portion of a rear rear-fender that is mounted to a rear portion of a vehicle body of a motorcycle, extending rearward and downward, and covering a rear wheel from upward and rearward, is provided to the rear rear-fender, and forms, with an internal surface of the rear rear-forms, a closed space having an inverted triangular shape when viewed from a vehicle side in which a space is gradually narrowed from an upper portion to a lower portion. Further, at the time of mounting, the rear rear-fender and the rear rear-fender bracket are coupled by being screwed together by rear winkers on sides of the vehicle (long holes). Further, a lower portion of the rear rear-fender and a lower portion of the rear rear-fender bracket are coupled by being screwed together by a license plate mounting bracket.

4 Claims, 15 Drawing Sheets

FOREIGN PATENT DOCUMENTS

| | | |
|---|---|---|
| JP | 62146690 U | 9/1987 |
| JP | 63-32671 | 6/1988 |
| JP | 5-124556 A | 5/1993 |
| JP | 8026160 A | 1/1996 |
| JP | 2003205875 A | 7/2003 |
| JP | 2007055488 A | 3/2007 |

OTHER PUBLICATIONS

Japanese Office Action, mailed Feb. 26, 2013, which issued during the prosecution of Japanese Patent Application No. 2009-022782, which corresponds to the present application.

* cited by examiner

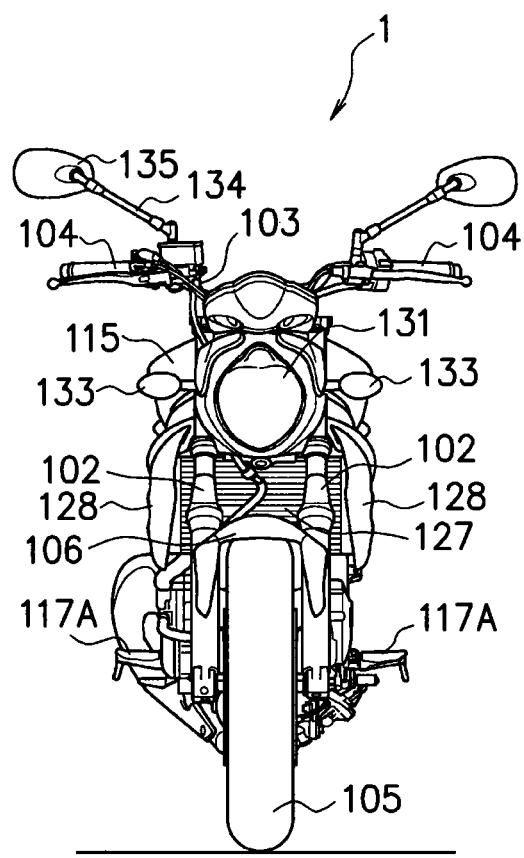
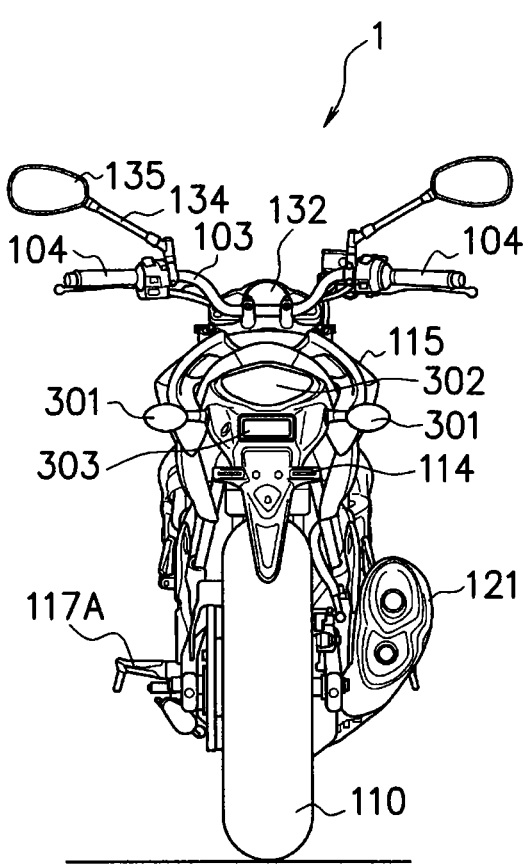

F I G. 15
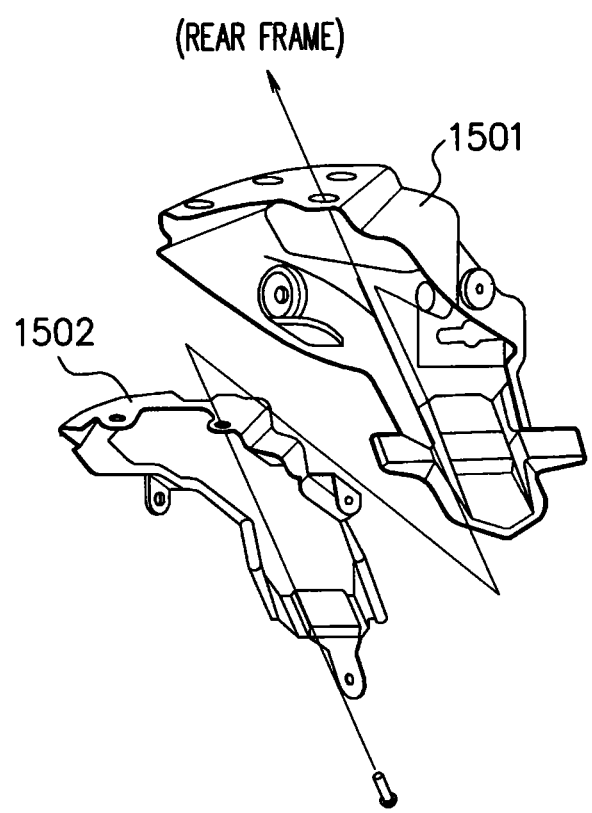

REAR FENDER STRUCTURE FOR MOTORCYCLE AND MOTORCYCLE

CROSS-REFERENCE TO RELATED APPLICATIONS

This application is based upon and claims the benefit of priority of the prior Japanese Patent Application No. 2009-022782, filed on Feb. 3, 2009, the entire contents of which are incorporated herein by reference.

BACKGROUND OF THE INVENTION

1. Field of the Invention

The present invention relates to a rear fender structure for motorcycle and a motorcycle, and more specifically to a structure relating to a security of rigidity and the like of a rear fender.

2. Description of the Related Art

In a motorcycle, a rear fender is mounted to a rear frame of a vehicle body frame by being fixed by bolts and the like. In recent years, it is often the case that a rear fender has a thin shape in terms of designing, and heavy objects such as a license plate and a license plate lamp are mounted to the rear fender at the rear thereof in an overhang state. Accordingly, a rigid member made of an aluminum or iron plate is mounted to such a rear fender by being screwed together to a rear frame from a rear surface thereof, to thereby realize an improvement in rigidity and the like.

FIG. 15 is a view showing an example of a conventional rear fender structure as described above. In the structure shown in FIG. 15, a frame-shaped rigid member 1502 made of iron is provided on a rear surface of a rear fender 1501, and they are screwed together to a rear frame, to thereby realize an improvement in rigidity. Further, Patent Document 1 discloses a structure in which a rear fender is divided into front and rear parts, and a taillight and a license plate are mounted to the rear fender positioned rearward.

[Patent Document 1] Japanese Examined Patent Publication No. 63-32671

However, the aforementioned conventional rear fender structure has problems as described below.

Specifically, at first, there is a problem that a structure (shape and arrangement) of parts becomes complicated. For instance, in the example shown in FIG. 15, since the rigid member 1502 is formed in the frame shape to correspond to the shape of the rear surface of the rear fender 1501, it takes time for processing. Further, cables and the like of various electrical components disposed on an internal surface of the rear fender are exposed to the outside, which gives an impression that the arrangement of parts is complicated, and further, it is hard to say that it is preferable in terms of security.

Further, there is a problem that the number of mounting parts is increased. For example, in the example shown in FIG. 15, although an upper side of the rigid member 1502 is fixed to the rear frame by being screwed together with the rear fender 1501, the other portions of the member have to be fixed at proper portions of the rear fender. For this reason, there is a need to provide a plurality of mounting portions using machining, welding and the like, and the number of nuts and the like for mounting is increased according thereto.

Further, a bracket is made of aluminum or iron, so that it may amplify a vibration, ascribable to its own weight, which creates a problem that an unnecessary load may be imposed on the rear fender. When the rear fender 1501 extends relatively long in a downward direction from the rear frame as in the example shown in FIG. 15, the rigid member 1502 has to be made large in order to securely prevent the vibration over the whole length of the rear fender. In such a case, the weight becomes heavy, which becomes a main cause to amplify the vibration.

SUMMARY OF THE INVENTION

The present invention has been made in view of such actual circumstances, and an object thereof is to sufficiently secure a rigidity of a rear fender without complicating a structure of parts. Further, the present invention has an object to realize a simplification of mounting operation and the like while sufficiently securing a rigidity of a rear fender and reducing the number of mounting parts.

A rear fender structure for motorcycle of the present invention is characterized in that it includes: a box-shaped rear fender having an upper end surface mounted to a rear portion of a vehicle body of the motorcycle, extending rearward and downward, covering a rear wheel from upward and rearward, and coupled to the rear portion of the vehicle body, and side walls having a substantially inverted triangular shape when viewed from a vehicle side and extending rearward and downward from both sides of the upper end surface; and a plate-shaped rear fender bracket integrally coupled to at least an upper portion and a lower portion of the rear fender to form a closed space, with an internal surface of the rear fender, having an inverted triangular shape when viewed from a vehicle side in which a space is gradually narrowed from an upper portion to a lower portion.

Further, in another rear fender structure for motorcycle of the present invention, it is characterized in that the rear fender bracket is a product formed of a synthetic resin.

Further, in another rear fender structure for motorcycle of the present invention, it is characterized in that an upper portion of the rear fender bracket is mounted to the rear portion of the vehicle body by being screwed together with the rear fender.

Further, in another rear fender structure for motorcycle of the present invention, it is characterized in that the rear fender and the rear fender bracket are coupled by being screwed together by rear winkers on sides of the vehicle.

Further, in another rear fender structure for motorcycle of the present invention, it is characterized in that a lower portion of the rear fender and a lower portion of the rear fender bracket are coupled by being screwed together by a license plate mounting bracket.

Further, in another rear fender structure for motorcycle of the present invention, it is characterized in that an opening is formed on an external surface on an upper side of the rear fender, a lighting portion of a rear combination lamp is faced to the outside from the opening, and at least a socket and a housing of the rear combination lamp are disposed in the closed space between the rear fender and the rear fender bracket.

Further, in another rear fender structure for motorcycle of the present invention, it is characterized in that an opening is formed on the rear fender bracket, and the socket of the rear combination lamp is exposed to the outside from the opening.

Further, in another rear fender structure for motorcycle of the present invention, it is characterized in that a cover member that covers the opening formed on the rear fender bracket in an openable/closable manner is further provided.

Further, in another rear fender structure for motorcycle of the present invention, it is characterized in that a key cylinder of a seat lock mechanism disposed in the vicinity of the rear portion of the vehicle body is disposed in the closed space between the rear fender and the rear fender bracket, and a seat lock cable of the seat lock mechanism is connected to the key cylinder through the closed space.

Further, a motorcycle of the present invention is characterized in that it includes the rear fender structure for motorcycle described above.

BRIEF DESCRIPTION OF THE DRAWINGS

FIGS. 3A and 3B are a front view and a rear view of the motorcycle according to the embodiment of the present invention;

FIG. 15 is a view for explaining an example of a conventional rear fender structure.

DETAILED DESCRIPTION OF THE PREFERRED EMBODIMENTS

Hereinafter, a preferred embodiment of the present invention will be described based on the drawings. FIGS. 1, 2, 3A and 3B are respectively a side view, a plan view, a front view and a rear view of a motorcycle 1 including a rear fender structure for motorcycle according to the present invention. At first, a schematic structure of the motorcycle 1 will be described by using FIG. 1 to FIGS. 3A and 3B. Note that in these drawings, a front of a vehicle and a rear of the vehicle are indicated by an arrow Fr and an arrow Rr, respectively.

<Overall Structure of Motorcycle 1>

Figure 1:
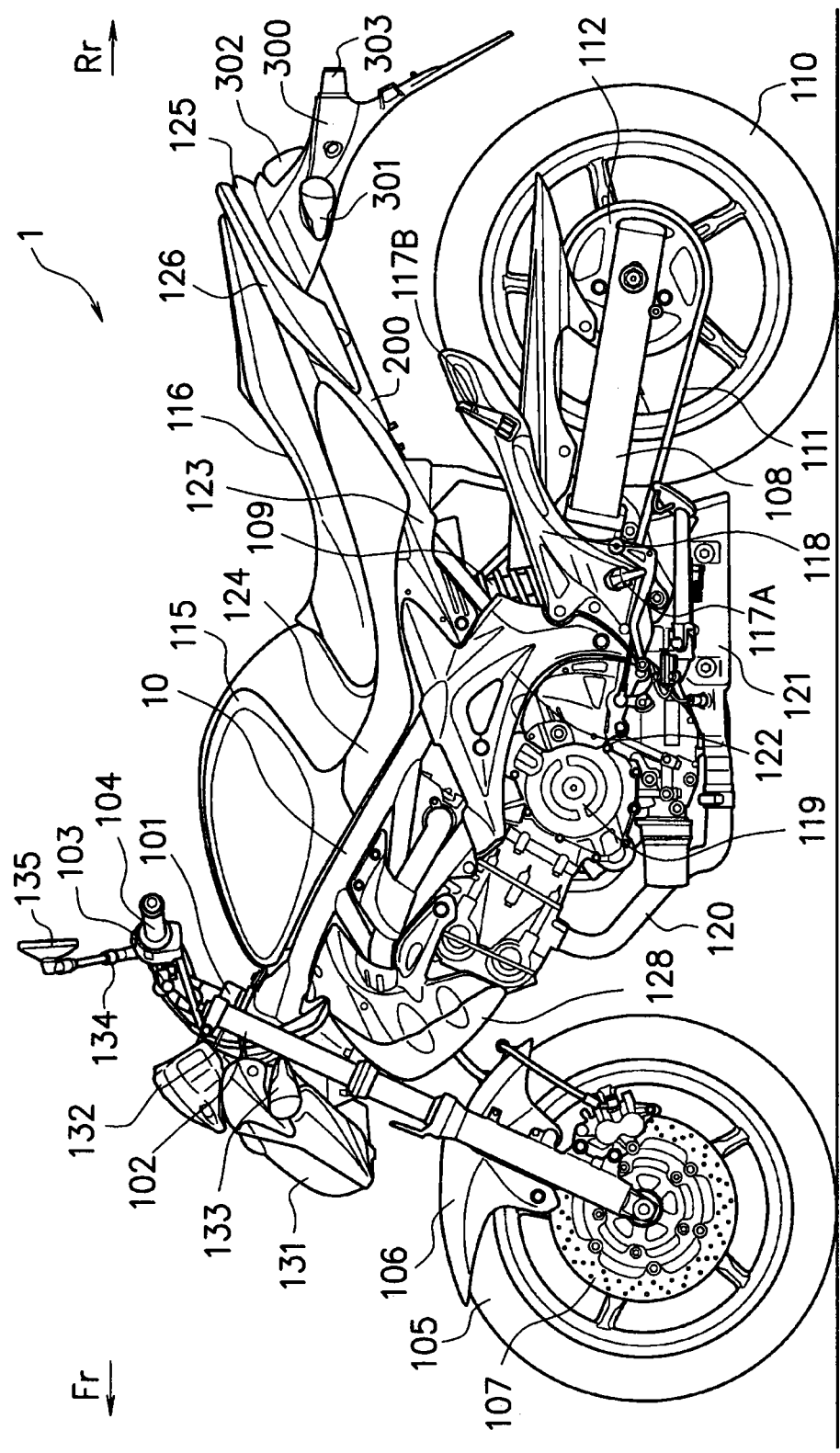
FIG. 1 is a side view of a motorcycle according to an embodiment of the present invention.

In FIG. 1, a main frame 10 is one of main members that constitute a skeletal structure of a vehicle body frame. The main frame 10 is made of a pair of left and right steel or aluminum alloy material, and front portions thereof are joined to a steering head pipe 101. Left and right two front forks 102 are supported to be able to pivot left and right by the steering head pipe 101. A handle bar 103 is fixed to upper ends of the front forks 102, and the handle bar 103 has grips 104 on both ends thereof. Further, a front wheel 105 is rotatably supported by lower portions of the front forks 102, and a front fender 106 is fixed to cover above the front wheel 105. In the front wheel 105, a brake disk 107 that rotates integrally with the front wheel is disposed.

The main frame 10 is branched into a two-pronged shape of left and right toward rearward from the steering head pipe 101, and each extends slantly rearward and downward. Swing arms 108 are swingably joined to lower sides of rear portions of the main frame 10 and a rear cushion absorber 109 is bridged therebetween. A rear wheel 110 is rotatably supported by rear ends of the swing arms 108, and the rear wheel 110 is rotation-driven via a driven sprocket 112 provided therein around which a chain 111 to transmit a motive power of an engine unit 119 is wound. A front rear-fender 200 is provided around an upper side of the rear wheel 110, and further, a rear rear-fender 300 is provided from the front rear-fender 200 in a rearward direction. The front rear-fender 200 is fixed to later-described seat rails 15 and the like coupled to rear ends of the main frame 10, and the rear-rear fender 300 is supported by a cross member 20 of the later-described seat rails 15 so as to be overlapped with a rear end of the front rear fender 200.

Further, a fuel tank 115 is mounted above the main frame 10 and a rider seat 116 is continuously provided behind the fuel tank 115. Below the rider seat 116, rider footrests 117A and tandem footrests 117B are respectively disposed. The footrests 117A, 117B are respectively provided to footrest frames 118 joined to the main frame 10.

Below the main frame 10, the engine unit 119 is mounted so as to be bridged. The engine unit 119 including a water-cooled V-type two-cylinder engine is supplied with an air-fuel mixture from a not-shown fuel injection device, and exhaust gas after combustion in the engine is exhausted through an exhaust pipe 120. The exhaust pipe 120 is joined to a muffler 121 on a lower side of the engine unit.

In the vehicle exterior, a plurality of covers are provided. Frame covers A 122 are fixed to the main frame 10, and cover sides of the main frame 10 and the engine unit 119. Frame covers B 123 are fixed to the main frame 10, and extend from above the frame covers A 122 to the rearward of the vehicle. Frame covers C 124 are fixed so as to overlap with the frame covers B 123, and cover sides of the fuel tank 115 and sides of the rider seat 116 in a continuous manner. A frame cover D 125 is fixed to the cross member 20 of the later-described seat rails 15, and covers rear sides of the sides of the rider seat 116. Further, a pair of rear grips 126 are provided to protrude in a vehicle width direction between the rider seat 116 and the frame cover D 125.

Figure 2:
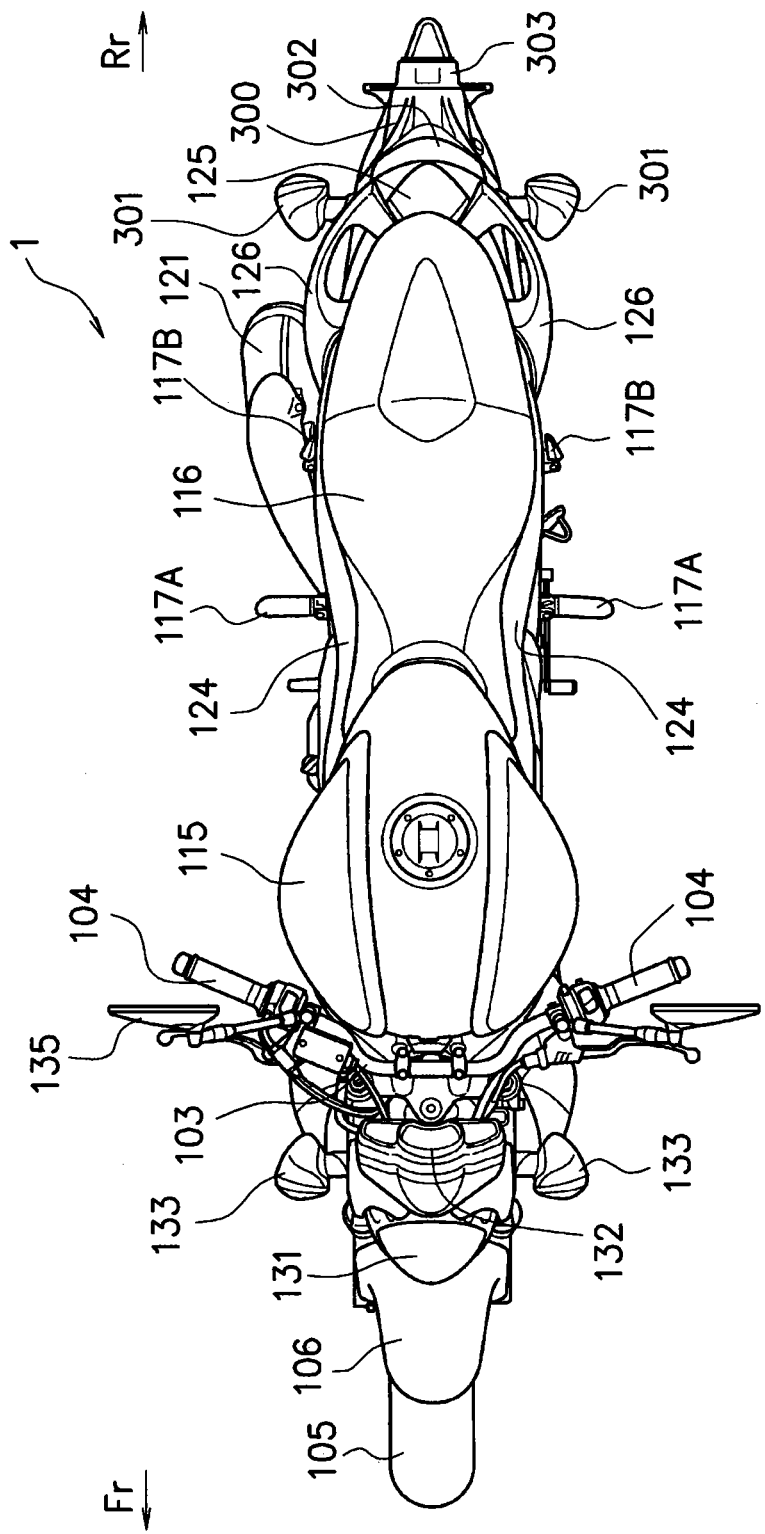
FIG. 2 is a plan view of the motorcycle according to the embodiment of the present invention.

The rider seat 116 and the frame cover D 125 exhibit a streamlined exterior form in plan view as shown in FIG. 2, and in accordance with this, the frame covers C 124 and the like also have a shape of extending in a smooth curve shape in a longitudinal direction. Note that each of the frame covers is formed by using, for instance, a plastic (resin) such as ABS.

Further, a radiator 127 (FIG. 3A) is disposed on the front of the engine unit 119, and on both sides of the radiator, radiator covers 128 formed in a curved surface shape are disposed. Since the radiator covers 128 are formed in the curved surface shape, they create a sense of uniformity together with the aforementioned frame covers having a smooth streamlined shape, which expresses an integrated design as a whole.

Behind the frame cover D 125, the aforementioned rear rear-fender 300 is continuously provided. The rear rear-fender 300 is provided with a pair of left and right rear winkers 301 on both sides thereof, and a rear combination lamp 302, a plate lamp 303 and the like on the rear thereof. Further, in front of the handle bar 103, there are disposed a headlight 131, a meter unit 132 including a speedometer, various indicator lamps and the like, and a pair of left and right front winkers 133 provided to protrude from both sides of the headlight 131. Further, above the handle bar 103, back mirrors 135 are disposed via stays 134. Note that the rear rear-fender 300 and the front rear-fender 200 are also formed of a plastic (resin) such as ABS, and the like.

<Vehicle Body Frame of Motorcycle 1>

Figure 4:
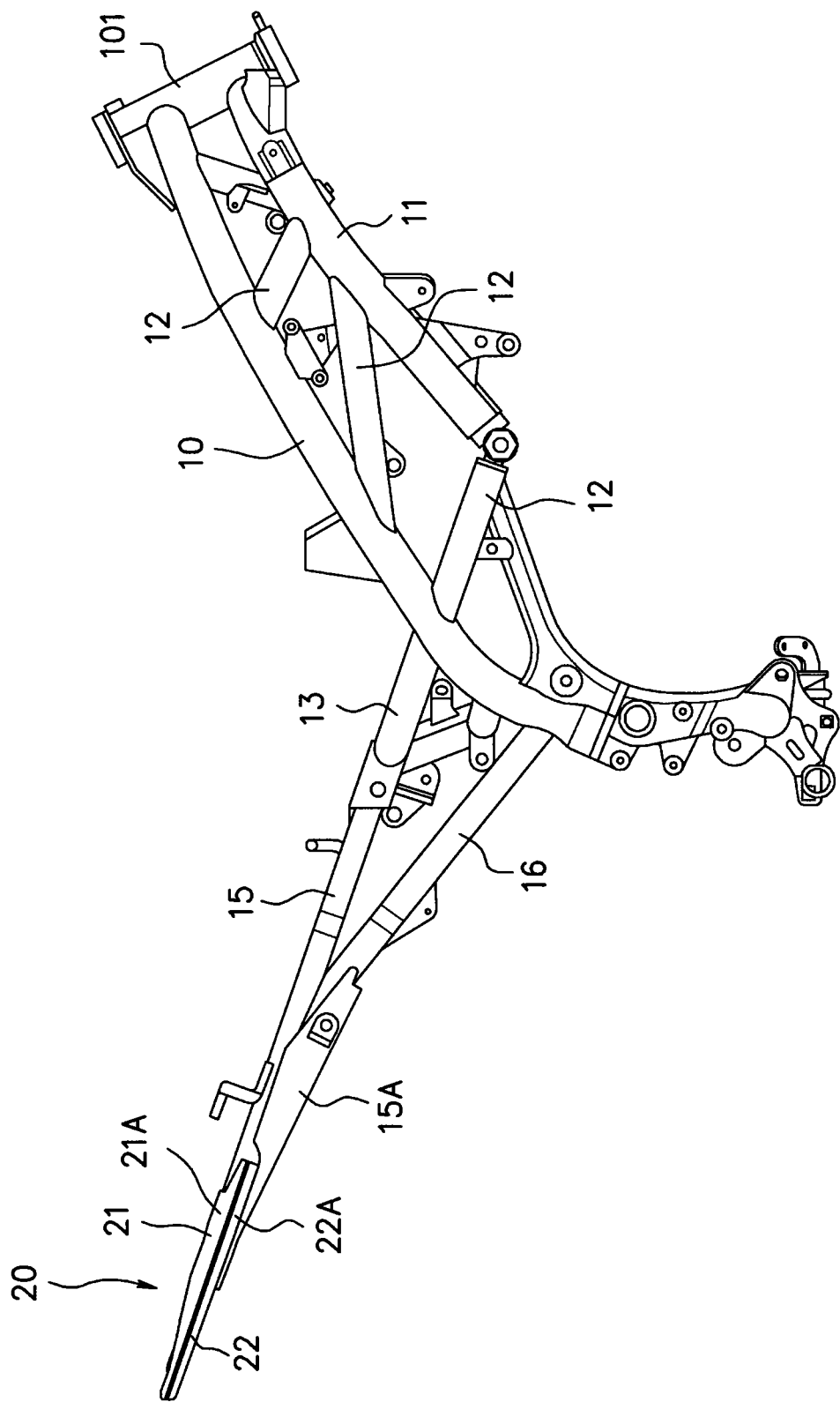
FIG. 4 is a side view of a vehicle body frame of the motorcycle according to the embodiment of the present invention.
Figure 5:
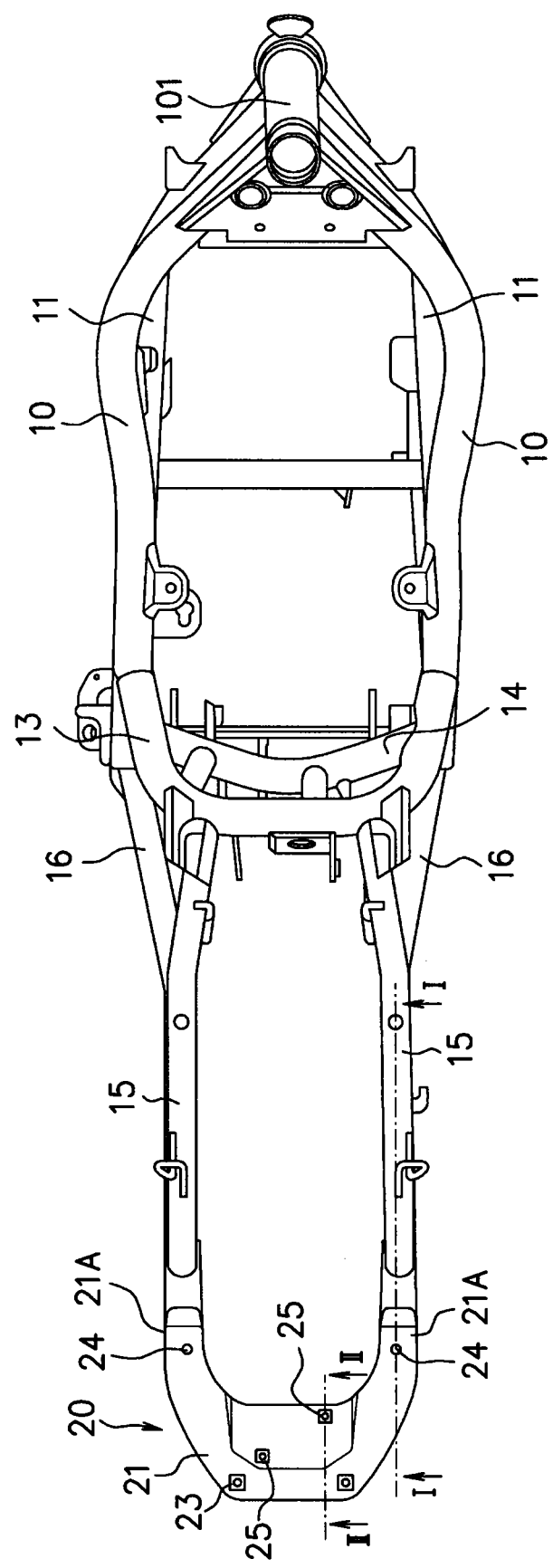
FIG. 5 is a plan view of the vehicle body frame of the motorcycle according to the embodiment of the present invention.

Next, a vehicle body frame of the motorcycle 1 will be described. FIG. 4 and FIG. 5 are respectively a side view and a plan view of the vehicle body frame of the motorcycle 1. Hereinafter, the vehicle body frame will be described by using FIGS. 4 and 5.

In the present embodiment, the vehicle body frame is formed of a plurality of members. As described above, the main frame 10 is branched into a two-pronged shape of left and right toward rearward from the steering head pipe 101, and each extends slantly rearward and downward. Note that the main frame 10 are slanted rearward and downward in the present embodiment, but, depending on types of vehicles, there can be considered a case where the main frame extends substantially horizontally to rearward. Sub-frame 11 is formed so as to be parallel with the main frame 10 to reinforce the main frame 10. The sub-frame 11 is branched into a two-pronged shape of left and right toward rearward from a lower side of a coupling position between the steering head pipe 101 and the main frame 10, and each extends slantly rearward and downward. Bridges 12 are welded or screwed to the main frame 10 and the sub-frame 11 at proper portions to couple the frames so that a sufficient strength to bridge the engine unit 119 is secured. Further, the pair of left and right rear ends of the main frame 10 are coupled by a cross member 13 welded to the rear side thereof having a horseshoe shape in plan view and slightly slanting rearward and upward. Further, the pair of left and right rear ends of the main frame 10 are coupled by a cross member 14 welded thereto in the vicinity of the footrests 117A.

A pair of left and right seat rails 15 are welded to a rear end of the cross member 13 of the main frame 10, and extend rearward and upward. Further, front ends of seat pillars 16 to reinforce the seat rails 15 are coupled in the vicinity of rear end portions of the main frame 10 below the seat rails 15, the seat pillars 16 extend rearward and upward and are coupled to the seat rails 15 at rear portions thereof. Note that the seat rails 15 and the seat pillars 16 structure a rear frame. Further, brackets for bridging the engine unit 119, brackets for fixing the fuel tank 115, and the like are formed at proper portions of the main frame 10 and the sub-frame 11.

Rear ends of the pair of left and right seat rails 15 are coupled by a seat rail cross member (hereinafter, simply referred to as cross member) 20 formed in a substantially U shape in plan view welded thereto. Since the cross member 20 has a substantially U shape or a substantially V shape in plan view, rear end portions of the seat rails 15 have a width in a horizontal direction that becomes narrow toward a rearward direction (width becomes gradually decreased) as shown in FIG. 5.

Hereinafter, details of the cross member 20 will be described. The cross member 20 is divided in a longitudinal direction (divided in half), and has a so-called hollow structure formed by joining an upper member 21 and a lower member 22 as shown in FIG. 4.

The cross member 20 has a substantially U shape or a substantially V shape in plan view as described above, and a vertical side portion 21A of the upper member 21 and a vertical side portion 22A of the lower member 22 having a substantially U shape or a substantially V shape are joined (connected) so as to cover the rear ends of the pair of left and right seat rails 15. Note that the joining portions are fixed by being welded and the like. Further, the vertical side portion 21A and the vertical side portion 22A correspond to portions that rise toward both sides of the U shape or the V shape.

Figure 6:
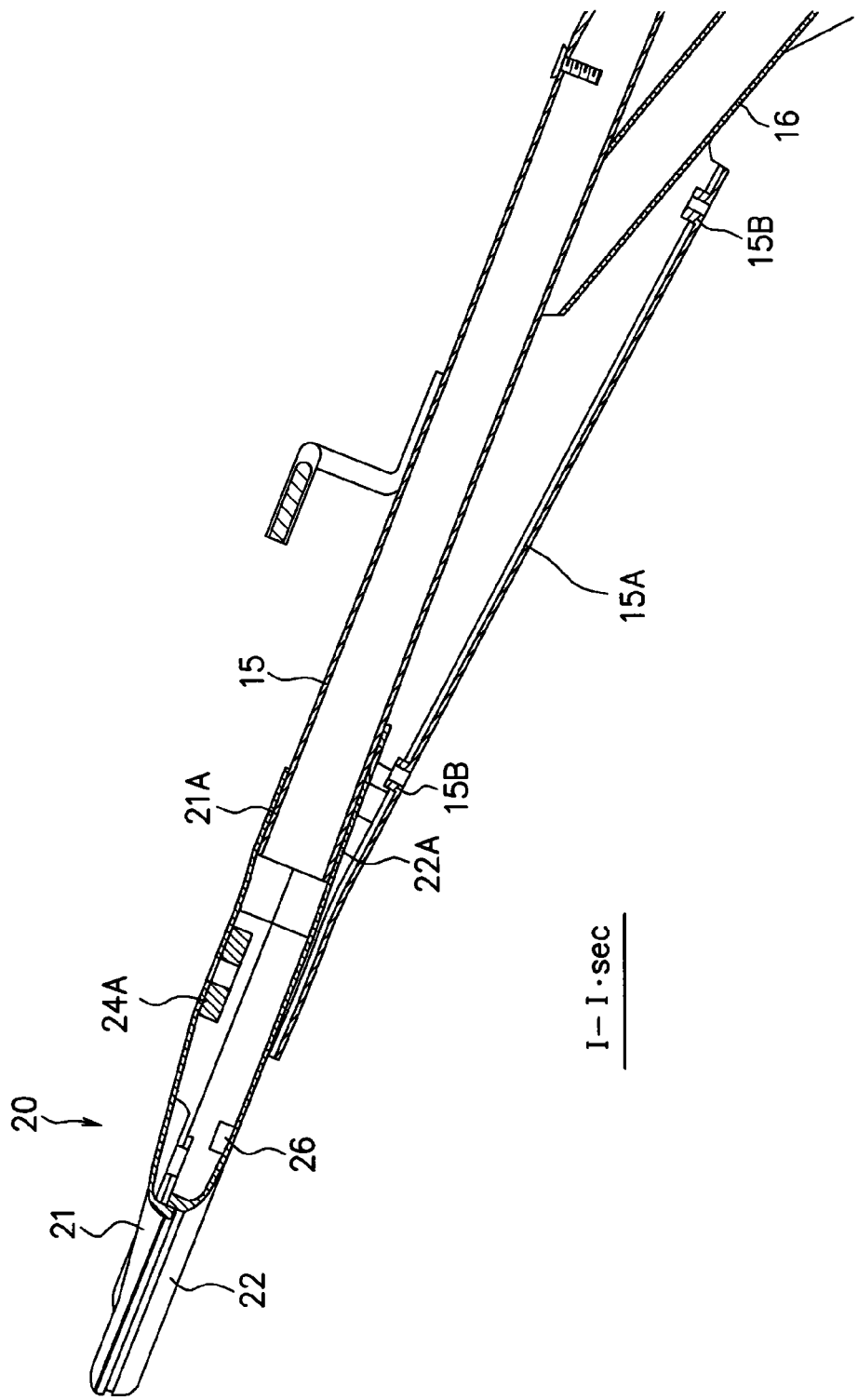
FIG. 6 is a view showing a cross section of a joining portion between a rear frame cross member and a seat rail of the vehicle body frame of the motorcycle according to the embodiment of the present invention.

FIG. 6 is a view showing a cross section (I-I cross section shown in FIG. 5) of the joining portion between the cross member 20 and the seat rail 15. As shown in FIG. 6, the vertical side portions 21A, 22A of the cross member 20 respectively have sizes larger than a circumferential diameter of the rear end of the seat rail 15 having a pipe shape, and are joined so as to cover the rear end of the seat rail 15. Note that an end portion of the vertical side portion 21A of the upper member 21 is obliquely cut toward forward and downward, and an upper portion thereof is opened (refer also to FIG. 4, FIG. 5, and the like). A joint portion when the cross member 20 is joined to the seat rail 15 is welded, and since the vertical side portion 21A has a slanted surface formed by being cut toward forward and downward, a large welding area can be obtained, which improves a joining strength.

Figure 7:
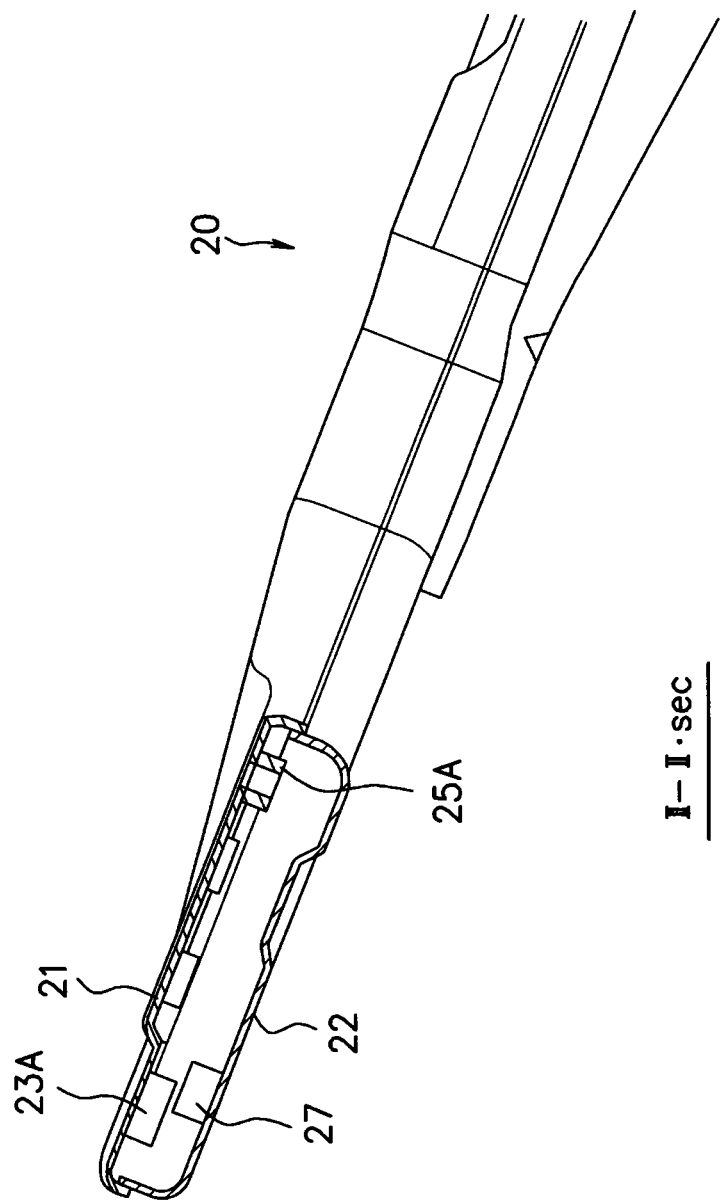
FIG. 7 is a view showing a cross section of a bottom portion having a substantially U shape or a substantially V shape in plan view of the rear frame cross member of the vehicle body frame of the motorcycle according to the embodiment of the present invention.

Further, the upper member 21 and the lower member 22 are formed in a substantially horseshoe shape opening upward or downward in a cross-sectional shape. FIG. 7 is a view showing a cross section (II-II cross section shown in FIG. 5) of a bottom portion having a substantially U shape or a substantially V shape in plan view of the cross member 20. As shown in FIG. 7, the upper member 21 is formed in a substantially horseshoe shape opening downward in a cross-sectional shape, and the lower member 22 is formed in a substantially horseshoe shape opening upward in a cross-sectional shape. Further, the upper member 21 is formed to be one size larger than the lower member 22 to cover the lower member 22 with an inner surface thereof. A joint portion when the upper member 21 and the lower member 22 are joined in a state of being faced to each other is welded, and since it is designed such that the upper member 21 is formed to be one size larger than the lower member 22 to entirely cover the lower member 22, the joining strength at the time of welding is improved. Note that the vertical side portion 21A of the upper member 21 and the vertical side portion 22A of the lower member 22 are formed in a semicircular shape in cross section to exactly correspond to the shape of the rear end of the seat rail 15.

When the upper member 21 and the lower member 22 are joined, there is formed a rectangular closed cross section in a cross-sectional shape as shown in FIG. 7. Accordingly, even if the members are thin with small shapes, it is possible to sufficiently secure the strength. Further, the cross member 20 has a substantially U-shaped bottom portion that is formed to have a wide width in a longitudinal direction. By securing a size of the members as described above, it becomes possible to secure the sufficient strength and to secure a space for mounting portions of various members. Note that the upper member 21 and the lower member 22 are formed by press-forming a plate material such as, for instance, a high-tensile steel plate, so that the formation thereof can be conducted relatively easily.

Further, mounting nuts being a plurality of mounting portions for mounting various parts are formed on the cross member 20, as shown in FIG. 5. Specifically, mounting nuts 23, 24 provided at four corners on an upper surface of the cross member 20 are mounting nuts for mounting the rear grips 126, and mounting nuts 25 provided on a front side of the U-shaped bottom portion are mounting nuts for mounting a later-described seat lock mechanism 150.

Upper surface openings of these mounting nuts 23 to 25 are formed by punching through press-forming, and nut portions are welded to a rear surface of the upper member 21. For instance, a nut portion 24A of the mounting nut 24 is welded to the rear surface of the upper member 21 as shown in FIG. 6, and a nut portion 25A of the mounting nut 25 is welded to the rear surface of the upper member 21 as shown in FIG. 7. Further, 26 in FIG. 6 denotes a mounting nut welded to a rear surface of the lower member 22 used for mounting the front rear-fender 200, and 27 in FIG. 7 denotes a mounting nut welded to the rear surface of the lower member 22 used for mounting the front rear-fender 200. Further, 23A denotes a nut portion of the mounting nut 23.

The mounting nuts as described above are welded after the formation of the upper member 21 and the lower member 22. The upper member 21 and the lower member 22 have a substantially horseshoe shape in cross section, and they form a hollow space (closed space) when being joined face-to-face. Accordingly, there is no chance that the nut portions of the mounting nuts limit a space for another member, and further, since the bottom portion of the upper member 21 and the lower member 22 having a substantially U shape or a substantially V shape in plan view is formed to have a wide width, a plurality of mounting nuts can be provided relatively easily. Note that the present embodiment has described that the nuts are welded to the upper member 21 or the lower member 22, but, if the strength at the time of mounting can be secured, it is also possible to integrally form portions having thicknesses corresponding to those of the nut portions through press-forming and to perform screw thread cutting on the portions.

<Members to be Mounted to Rear of Vehicle>

Figure 8:
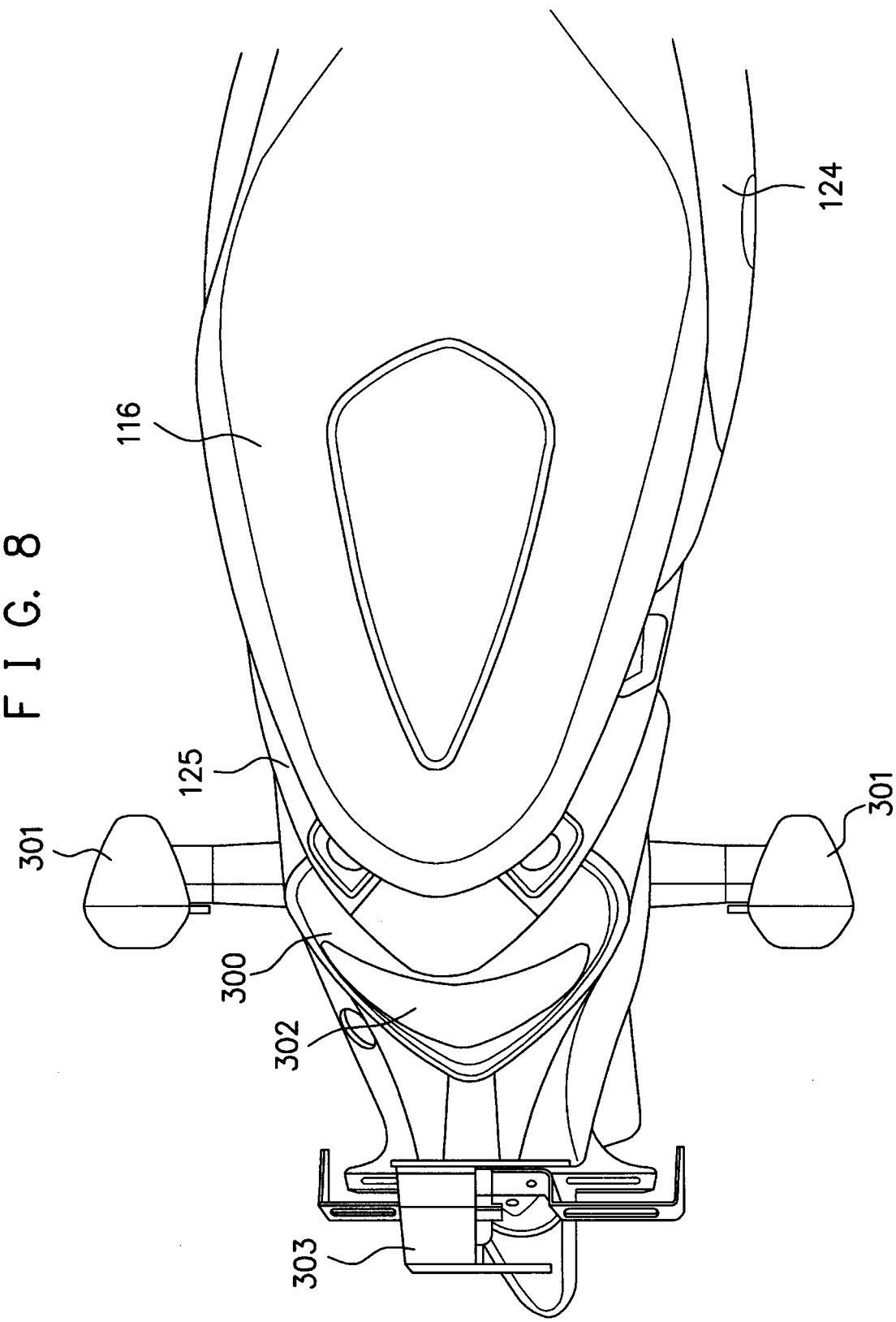
FIG. 8 is a view looking down from above on a rear of a vehicle of the motorcycle according to the embodiment of the present invention.

Next, various members on the rear of the vehicle to be fixed to the seat rails 15 and the cross member 20 will be described. FIG. 8 is a view looking down from above on the rear of the vehicle of the motorcycle 1. As shown in FIG. 8, the rider seat 116, the frame cover D 125, the rear rear-fender 300, and the like are mounted to the rear of the vehicle. Note that, although not shown in the present drawing, the rear grips 126 are mounted between the rider seat 116 and the frame cover D 125.

Figure 9:
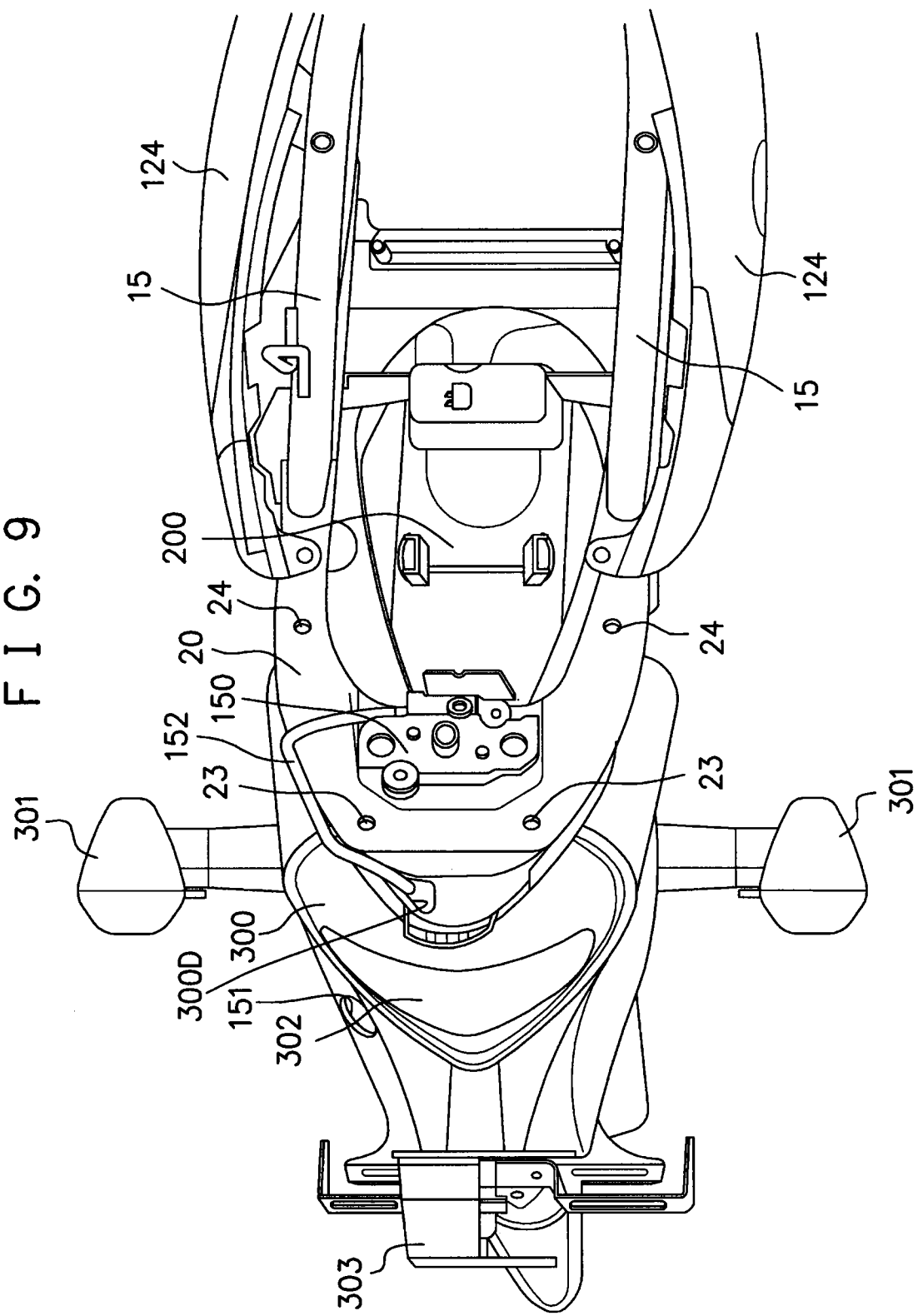
FIG. 9 is a view looking down from above on the rear of the vehicle of the motorcycle according to the embodiment of the present invention.

FIG. 9 is a view where a state in which the rider seat 116 and the frame cover D 125 are removed from a state shown in FIG. 8 is looked down from above.

In FIG. 9, the mounting nuts 23, 24 are the mounting nuts for the rear grips 126, and the rear grips 126 are fixed on the cross member 20. Further, as shown in FIG. 9, the rear fender formed of the front rear-fender 200 and the rear rear-fender 300 is fixed under the seat rails 15 and the cross member 20. Hereinafter, a mounting structure of the rear fender will be described in detail with reference also to an exploded perspective view of the rear fender shown in FIG. 10.

<Mounting Structure of Rear Fender>

In the motorcycle 1 according to the present embodiment, the rear fender is formed of the front rear-fender 200 and the rear rear-fender 300.

Figure 10:
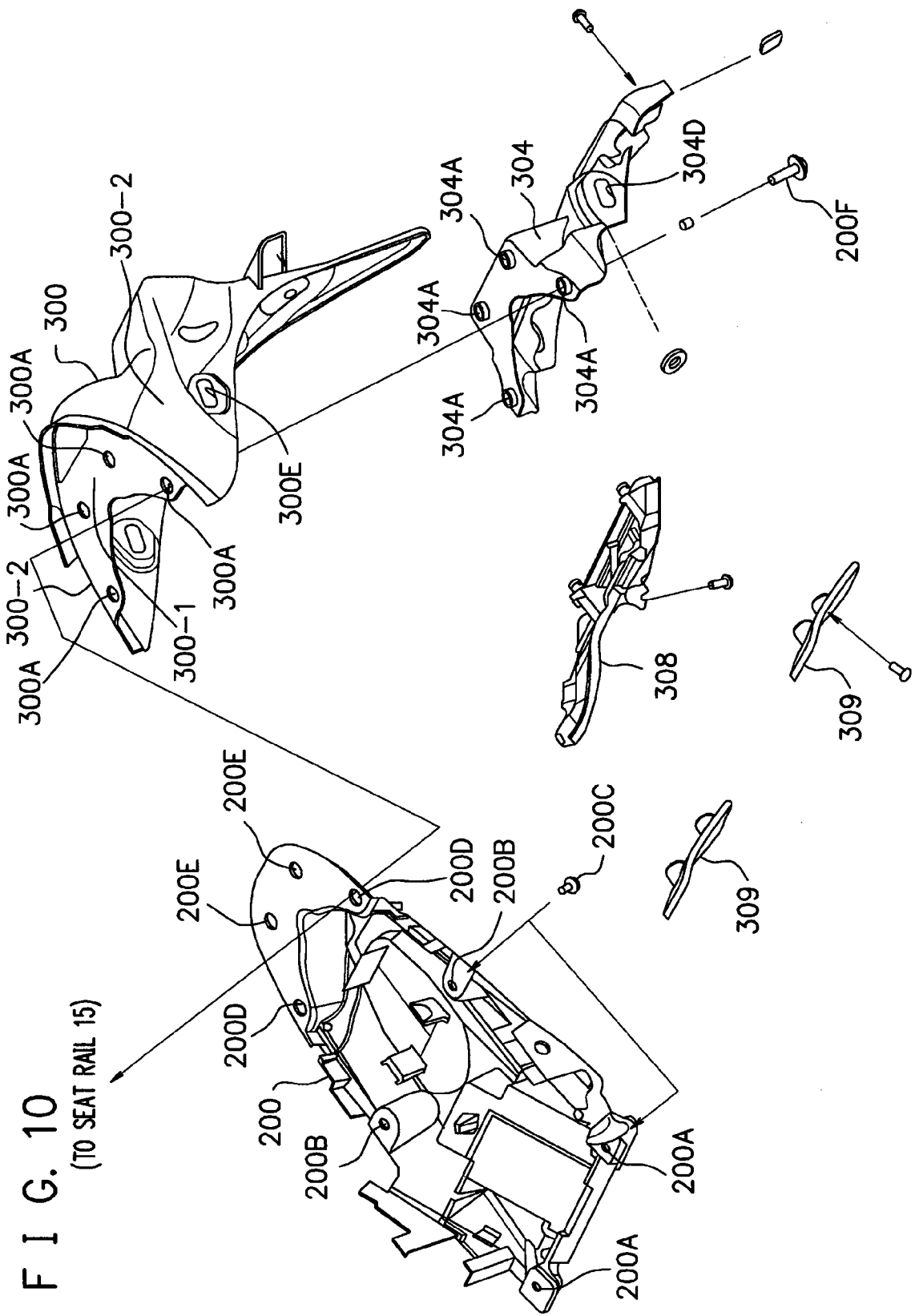
FIG. 10 is an exploded perspective view of a rear fender of the motorcycle according to the embodiment of the present invention.

At first, the front rear-fender 200 is fixed to the seat rails 15 and the cross member 20 at the rear ends thereof. As shown in FIG. 4 and FIG. 6, gusset plates 15A provided to the left and right of the seat rails 15 and extending in the vehicle longitudinal direction are welded to the seat rails 15. The gusset plate 15A is provided with a pair of mounting nuts 15B at front and rear portions thereof, and a front part of the front rear-fender 200 is mounted to the mounting nuts 15B. More specifically, mounting holes 200A and mounting holes 200B are respectively formed on a front end and on a substantially center of the front rear-fender 200, as shown in FIG. 10. The mounting holes 200A, 200B are aligned with the mounting nuts 15B and screwed with bolts 200C, to thereby fix the front part of the front rear-fender 200.

Further, a rear end of the front rear-fender 200 is mounted by screwing bolts into mounting nuts 26, (FIG. 6, FIG. 7) formed on the lower member 22 of the cross member 20. More specifically, a pair of left and right mounting holes 200D, 200E are formed on a rear end of the front rear-fender 200 at front and rear portions thereof, as shown in FIG. 10, in which the mounting holes 200D and the mounting holes 200E are respectively aligned with the mounting nuts 26 and the mounting nuts 27 and fixed by bolts 200F.

Meanwhile, the rear rear-fender 300 is fixed to the cross member 20 by being screwed together with the front rear-fender 200, as shown in FIG. 10. Further, a rear rear-fender bracket 304 that forms a rear surface of the rear rear-fender 300 is also fixed to the cross member 20 by being screwed together with the front rear-fender 200, as shown in FIG. 10.

On an upper end of the rear rear-fender 300, engaging holes 300A are formed to correspond to the positions of the mounting holes 200D, 200E formed on the rear end of the front rear-fender 200. Further, also on an upper end of the rear rear-fender bracket 304, engaging holes 304A are formed to correspond to the positions of the mounting holes 200D, 200E formed on the rear end of the front rear-fender 200 or the positions of the engaging holes 300A of the rear rear-fender 300. Accordingly, the rear rear-fender 300 and the rear rear-fender bracket 304 are screwed together with the front rear-fender 200 and fixed to the seat rails 15 by the bolts 200F.

The rear rear-fender bracket 304 has a plate shape extending slantly rearward and downward from an upper end thereof, and when being fixed, it covers an internal surface (rear surface) of the rear rear-fender 300. Here, FIG. 11 is a view where a state in which the rear rear-fender bracket 304 is mounted to the inside of the rear rear-fender 300 is looked down obliquely from a lower side of the vehicle.

Figure 11:
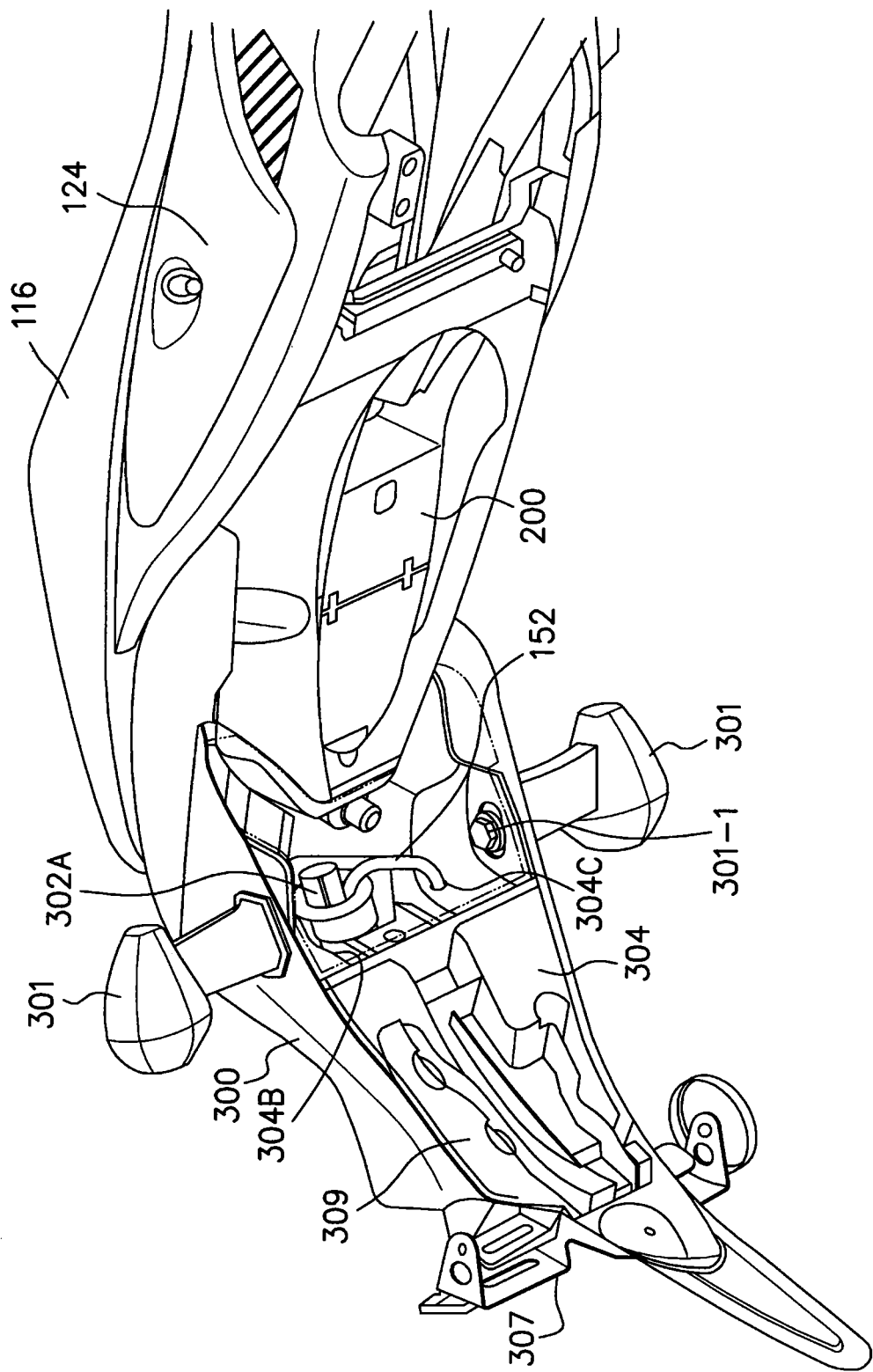
FIG. 11 is a view where a state in which a rear rear-fender bracket is mounted to the inside of a rear rear-fender of the rear fender of the motorcycle according to the embodiment of the present invention is looked down obliquely from a lower side of the vehicle.

As shown in FIGS. 10, 11, and the like, the rear-rear fender 300 has a box shape in which side walls 300-2 (FIG. 10) having a substantially inverted triangular shape in side view and extending rearward and downward are provided to both sides of an upper end surface 300-1 (FIG. 10) positioned along a horizontal plane. The rear rear-fender bracket 304 is housed inside the upper end surface and the both side walls of the rear rear-fender 300 and is mounted to cover the internal surface of the rear rear-fender. When the rear rear-fender bracket 304 is mounted to the internal surface of the rear rear-fender 300 as described above, a closed space is formed therebetween in the present embodiment. By forming such a closed space, not only the improvement in rigidity of the rear fender but also an effective use of space and the like are realized in the present embodiment. Hereinafter, details regarding the closed space formed between the rear rear-fender 300 and the rear rear-fender bracket 304 will be described.

<Closed Space Between Rear Rear-Fender and Rear Rear-Fender Bracket>

Figure 12:
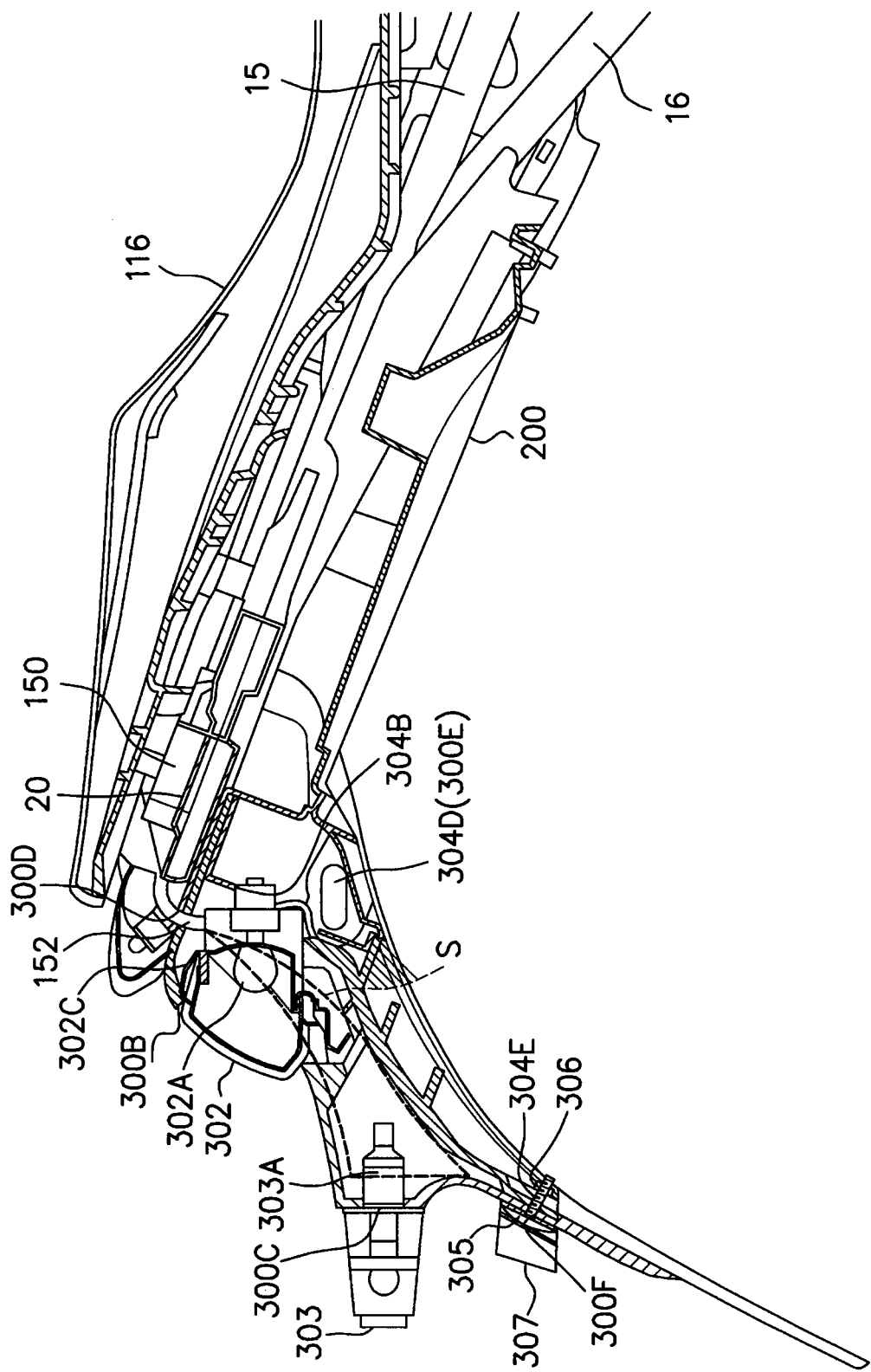
FIG. 12 is a sectional view of the rear portion of the vehicle of the motorcycle according to the embodiment of the present invention along a vehicle longitudinal direction on a slightly forward side of a direction perpendicular to the drawing paper from a center of a vehicle width direction.

FIG. 12 is a sectional view of the rear portion of the vehicle along the vehicle longitudinal direction on a slightly forward side of a direction perpendicular to the drawing paper from a center of the vehicle width direction. As shown in FIG. 12 (refer also to FIG. 1), in a cross-sectional shape in the vehicle longitudinal direction, an external surface of the rear rear-fender 300 firstly extends rearward and downward from the upper end surface 300-1 fixed to the cross member 20, and then extends in a substantially horizontal direction. The external surface further bends and extends downward in a substantially vertical direction, and thereafter, it extends while slanting rearward and downward. Further, an external surface of the rear rear-fender bracket 304 (surface on a rear side of the vehicle) extends rearward and downward from the upper end surface thereof fixed to the cross member 20 in the vehicle longitudinal direction in a state of being separated from the external surface of the rear rear-fender 300, and overlaps with the rear rear-fender 300 at a rear end thereof while gradually narrowing a distance therebetween.

Specifically, the external surface of the rear rear-fender bracket 304 (surface on the rear side of the vehicle) extends rearward and downward from the upper end surface thereof fixed to the cross member 20 in the vehicle longitudinal direction in a state of being separated from the external surface of the rear-rear fender 300, and overlaps with the rear rear-fender 300 at the rear end thereof while gradually narrowing a distance therebetween, so that there is formed a closed space (S), between the rear rear-fender 300 and the rear rear-fender bracket 304, having a substantially inverted triangular shape when viewed from a vehicle side as shown in FIG. 12, in which a space is gradually narrowed.

When such a closed space (S) is formed between the rear rear-fender 300 and the rear rear-fender bracket 304, a truss-like structure is formed between the rear rear-fender bracket 304 and the rear rear-fender 300. Accordingly, by integrally coupling the rear rear-fender bracket 304 to the rear rear-fender 300 to form the closed space (S) therebetween, the rear rear-fender bracket 304 serves as a rigid member, which improves not only the rigidity of the entire rear fender but also a shake-proof. Further, both the rear rear-fender 300 and the rear rear-fender bracket 304 are products formed of resins, so that they can secure high rigidity in spite of their light weight. Besides, since the rear rear-fender bracket 304 is light in weight, it never amplifies a vibration during traveling, ascribable to its own weight, so that there is no chance to impose an unnecessary load on the rear rear-fender 300.

Figure 13:
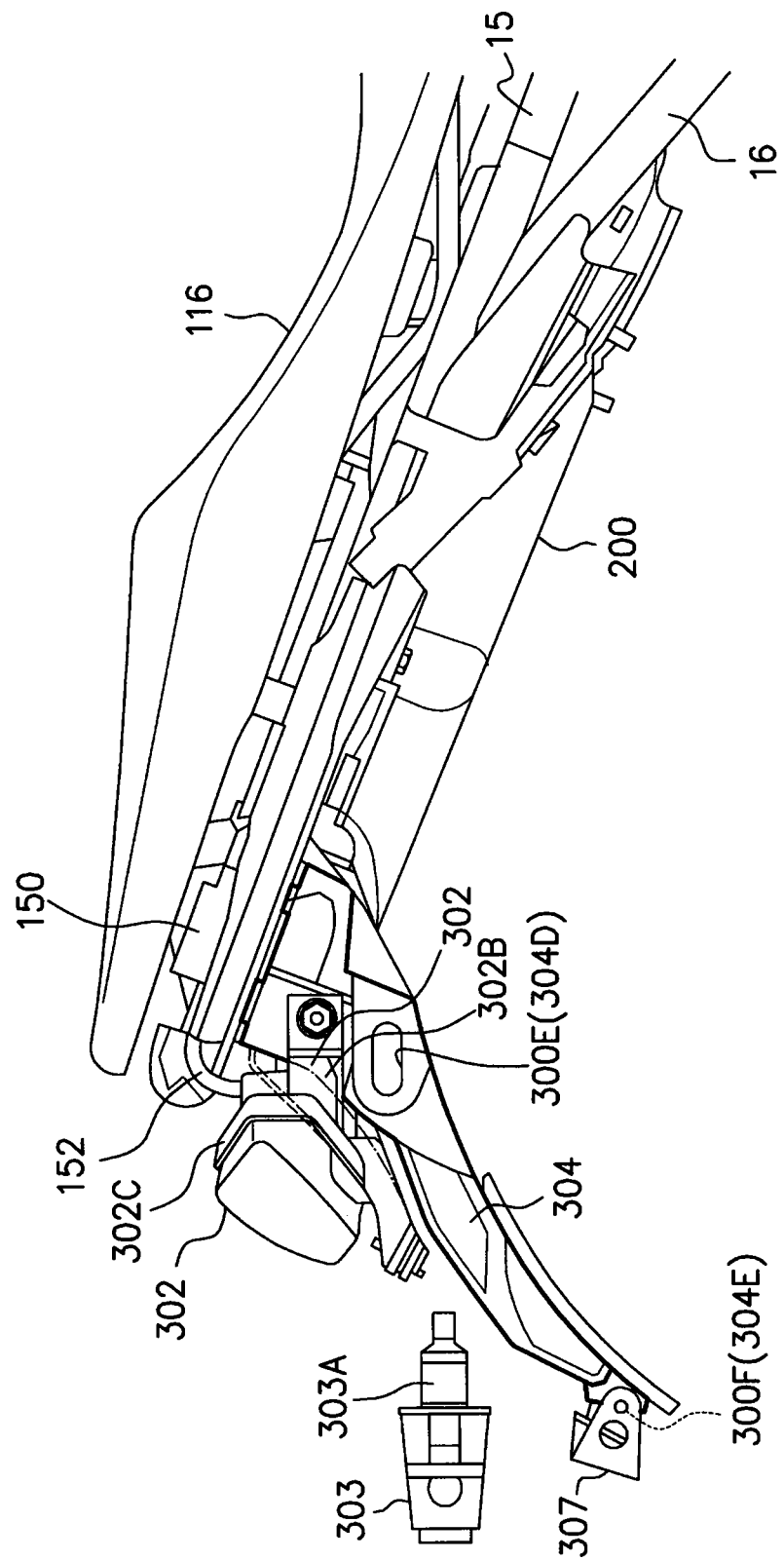
FIG. 13 is a view in which the rear rear-fender bracket of the rear fender of the motorcycle according to the embodiment of the present invention is seen from a side thereof.

Next, description will be made regarding parts disposed in the closed space (S) formed between the rear rear-fender 300 and the rear rear-fender bracket 304. On the external surface of the rear rear-fender 300 firstly extending rearward and downward from the upper end surface 300-1 fixed to the cross member 20, a rectangular opening 300B extending in the vehicle width direction is formed. Through this opening 300B, the rear combination lamp 302 fixed to the rear rear-fender bracket 304 is inserted, and it is set such that only a cover portion of the rear combination lamp 302 is faced to the outside. FIG. 13 is a view in which the rear rear-fender bracket 304 is seen from a side thereof. For convenience sake, the rear rear-fender 300 is not shown and a visible outline of the rear rear-fender bracket 304 is shown by a heavy line in the present drawing. As shown in FIG. 13, the rear combination lamp 302 is mounted to protrude rearward of the vehicle via stays 302B mounted to both sides of the rear rear-fender bracket 304.

Further, as shown in FIG. 11 or FIG. 12, on the rear rear-fender bracket 304, an opening 304B through which a socket side of a bulb 302A of the rear combination lamp 302 is inserted is formed. Further, it is designed such that the socket of the bulb 302A can be exposed by being directed inward from the opening 304B.

By disposing the rear combination lamp 302 in the closed space (S) as described above, the effective use of space is realized in the present embodiment. Further, the socket of the bulb 302A of the rear combination lamp 302, the stays 302B for mounting, a housing 302C, and the like are designed not to be exposed to the exterior, so that a complicated impression is not given from the appearance and the form of appearance can be made smart, which results in improving the appearance. Further, since the socket of the bulb 302A can be exposed by being directed inward from the opening 304B, maintenance such as exchange operation of bulbs can be conducted easily.

Next, the external surface of the rear rear-fender 300 extends in a substantially horizontal direction from below the rear combination lamp 302, and thereafter, it bends and extends downward in a substantially vertical direction. Here, an opening 300C through which a bulb 303A of the plate lamp 303 is inserted is formed on the external surface of the rear rear-fender 300 that extends downward in a substantially vertical direction, and a part of the bulb 303A is housed in the closed space (S) through the opening 300C. By disposing the bulb 303A of the plate lamp 303 in the closed space (S) as described above, the effective use of space is realized.

Further, as shown in FIG. 9, the seat lock mechanism 150 is fixed to the mounting nuts 25 (FIG. 5) on the upper surface of the cross member 20. The seat lock mechanism 150 is a device for unlocking and locking the rider seat 116, and in the present embodiment, the unlocking is performed by a predetermined key operation, and the locking is performed by pushing the rider seat 116 into the seat lock mechanism 150. A key cylinder 151 for unlocking is provided inside the closed space (S) with a key hole thereof exposed from the external surface on the left side of the rear rear-fender 300 (FIG. 9). Note that a housing space is formed on an upper surface of the front rear fender 200 on the front of the seat lock mechanism 150, and it is designed such that the housing space can be opened by unlocking the rider seat 116.

The seat lock mechanism 150 is connected to the key cylinder 151 via a seat lock cable 152. The seat lock cable 152 performs push-pull operation in accordance with the key operation to unlock the seat lock mechanism 150. As shown in FIG. 12, the seat lock cable 152 passes through an upper surface opening 300D formed on the upper surface of the rear rear-fender 300, and enters the closed space (S). Thereafter, the cable passes through the opening 304B on the rear rear-fender bracket 304, again enters the closed space (S) by passing through a cable hole 304C (FIG. 11) formed on the rear rear-fender bracket 304, and connects to the key cylinder 151.

The key cylinder 151 and the seat lock cable 152 are disposed in the closed space (S) as described above, so that in the present embodiment, the effective use of space is realized, and since they are not visible in appearance, no complicated impression is given, and further, by providing a structure in which the unlocking is difficult to be performed from the outside, the improvement in security is realized.

Note that, although a plurality of openings, mounting portions and the like are formed on the rear rear-fender 300 and the rear rear-fender bracket 304 in accordance with the disposition of the aforementioned various parts, since the rear rear-fender 300 and the rear rear-fender bracket 304 are products formed of resins, the plurality of openings, mounting portions and the like can be formed easily and inexpensively.

Next, details of a mounting method of the rear rear-fender bracket 304 to the rear rear-fender 300 will be described. As described above, the upper end surfaces of the rear rear-fender 300 and the rear rear-fender bracket 304 are overlapped with each other and fixed to the cross member 20 at the rear ends of the seat rails 15, in which the rear rear-fender 300 and the rear rear-fender bracket 304 are integrally joined (coupled) at respective portions.

At first, joining portions between the rear rear-fender 300 and the rear rear-fender bracket 304 in the vehicle width direction will be described. As shown in FIG. 10, long holes 300E are formed on both side surfaces of the rear rear-fender 300 in the vehicle width direction. Further, long holes 304D are formed also on both side surfaces of the rear rear-fender bracket 304 in the vehicle width direction. The long holes 300E and the long holes 304D are aligned when the rear rear-fender bracket 304 is mounted to the rear rear-fender 300. Subsequently, the rear winkers 301 are fixed to the aligned long holes 300D and long holes 304D via bolts, washers (301-1) and the like, as shown in FIG. 11. Specifically, the rear rear-fender 300 and the rear rear-fender bracket 304 are joined by being screwed together by the rear winkers 301 on both sides in the vehicle width direction. As described above, by joining the rear rear-fender bracket 304 and the rear rear-fender 300 using the rear winkers 301, the increase in the number of parts is prevented in the present embodiment. Further, in accordance with the use of the rear winkers 301, the rear rear-fender bracket 304 is formed by being extended in the vehicle width direction, so that a long span of the closed space (S) in the vehicle width direction can be obtained and a capacity of the space can be secured, which enables to sufficiently improve the strength.

Next, a joining portion at lower ends of the rear rear-fender 300 and the rear rear-fender bracket 304 will be described. As described above, the external surface of the rear rear-fender bracket 304 (surface on the rear side of the vehicle) extends rearward and downward from the upper end surface thereof fixed to the cross member 20 in the vehicle longitudinal direction in a state of being separated from the external surface of the rear rear-fender 300, and overlaps with the rear rear-fender 300 at the rear end thereof while gradually narrowing a distance therebetween. On the overlapped portions of the rear rear-fender 300 and the rear rear-fender bracket 304, a through hole 300F and a through hole 304E as shown in FIG. 12 are respectively formed. The through hole 300F and the through hole 304E are aligned when the rear rear-fender bracket 304 is mounted to the rear rear-fender 300. Further, by engaging the aligned through hole 300F and through hole 304E using a screw 305 and a nut 306 as shown in FIG. 12, the lower ends of the rear rear-fender 300 and the rear rear-fender bracket 304 are joined. Further, in the present embodiment, a license plate mounting bracket 307 is fixed by being screwed together with the through hole 300F and the through hole 304E, as shown in FIG. 12. As described above, by joining the rear rear-fender bracket 304 to the rear rear-fender 300 by screwing them together with the license plate mounting bracket 307, the increase in the number of parts is prevented.

Figure 14:
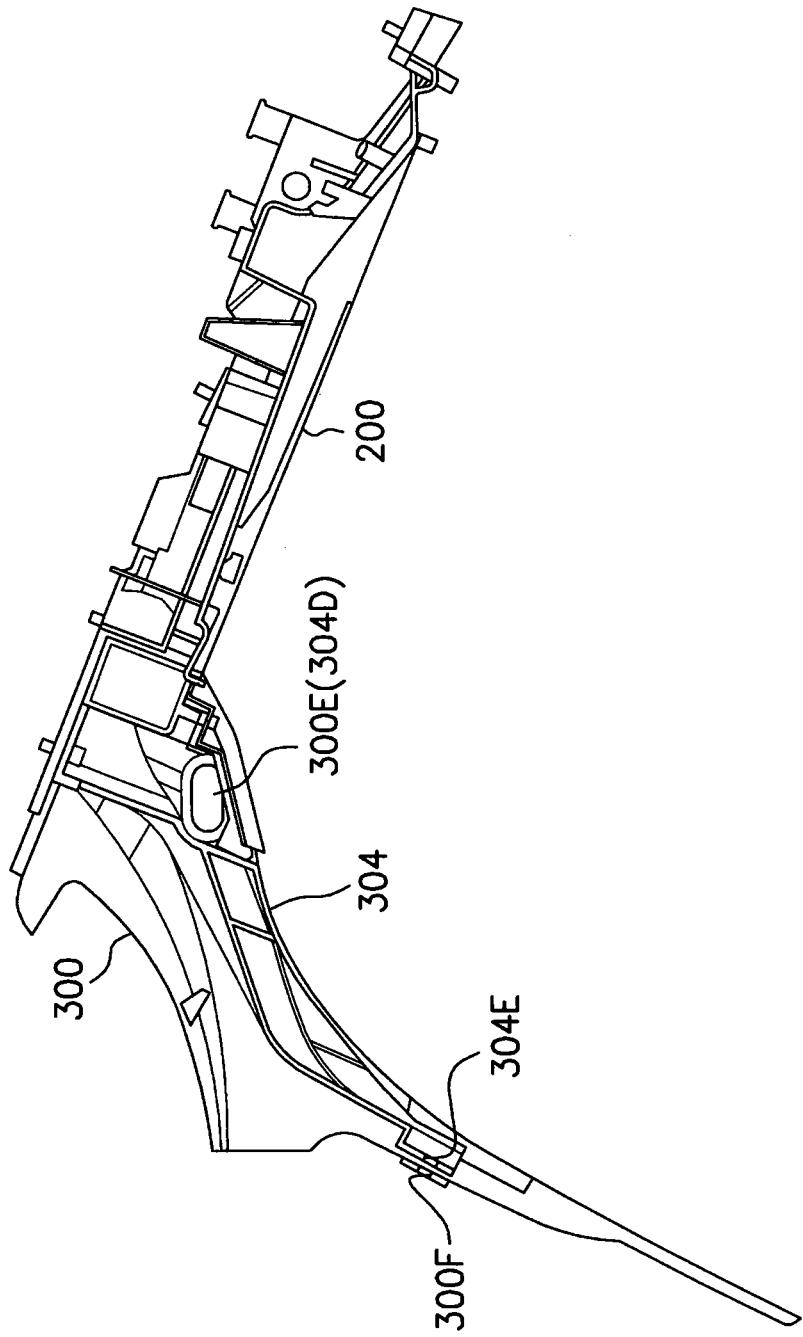
FIG. 14 is an interior view in which the rear fender of the motorcycle according to the embodiment of the present invention is seen from a forward side toward the vehicle width direction being the back direction in the drawing paper.

Note that FIG. 14 is an interior view in which the rear rear-fender 300 and the rear rear-fender bracket 304 of the rear fender are seen from a forward side toward the vehicle width direction being the back direction in the drawing paper. A positional relationship between the long hole 300E and the long hole 304D and that between the through hole 300F and the through hole 304E become as shown in FIG. 14.

At last, description will be made regarding members to be mounted inside the rear rear-fender bracket 304. As described above, the opening 304B through which the socket side of the bulb 302A of the rear combination lamp 302 is inserted is formed on the rear rear-fender bracket 304. The opening 304B is covered by a cover member 308 shown in FIG. 10. Accordingly, it is possible to design such that the socket side of the bulb 302A is not exposed to the exterior except at the time of maintenance. Further, a guard member 309 shown in FIG. 10 covers the through hole 304E with which the license plate mounting bracket 307 is screwed together. Accordingly, the screw 305 and the like for performing screwing-together operation are prevented from water from a road surface and the like.

The above is the description regarding the embodiment of the rear fender structure for motorcycle according to the present invention. Specifically, in the present embodiment, the rear rear-fender bracket 304 formed in a plate shape is extended rearward and downward from the upper end surface thereof integrally coupled to the upper portion of the rear rear-fender 300, and is overlapped with the rear rear-fender 300 at the rear end (lower portion) thereof while gradually narrowing the distance or the space therebetween, so that the closed space (S) having a substantially inverted triangular shape when viewed from a vehicle side is formed between the rear rear-fender 300 and the rear rear-fender bracket 304. Further, by forming such a closed space (S), namely, by forming a truss-like structure between the rear rear-fender bracket 304 which serves as a rigid member and the rear rear-fender 300, not only the rigidity of the entire rear fender but also a shake-proof is improved. Note that although the space is set as the closed space in the present embodiment, the rigidity can be secured also with a structure in which both side surfaces are opened. Further, both the rear rear-fender 300 and the rear rear-fender bracket 304 are products formed of resins, so that they can secure high rigidity in spite of their light weight. Besides, since the rear rear-fender bracket 304 is light in weight, it never amplifies a vibration during traveling, ascribable to its own weight, so that there is no chance to impose an unnecessary load on the rear rear-fender 300.

Further, by forming the closed space (S), the structure of parts is simplified. For instance, by disposing the rear combination lamp 302 in the closed space (S), the effective use of space is realized in the present embodiment, and since it is possible to design such that the socket of the bulb 302A of the rear combination lamp 302, the stays 302B for mounting, the housing 302C, and the like are not exposed to the exterior, a complicated impression is not given from the appearance and the form of appearance can be made smart, which results in improving the appearance.

Further, the key cylinder 151 and the seat lock cable 152 are disposed in the closed space (S), so that in the present embodiment, the effective use of space is realized, and since they are not visible in appearance, no complicated impression is given, and further, by providing a structure in which the unlocking is difficult to be performed from the outside, the improvement in security is realized.

Here, although the shape of the rear fender becomes complicated in accordance with the disposition of the various parts, the entire rear fender is a product made of resin and thus can be formed easily and inexpensively, so that no influence is given on the cost and the like.

Further, in the present embodiment, the increase in the number of parts is prevented by joining the rear rear-fender bracket 304 and the rear rear-fender 300 using the rear winkers 301. Further, in accordance with the use of the rear winkers 301, the rear rear-fender bracket 304 is formed by being extended in the vehicle width direction, so that a long span of the closed space (S) in the vehicle width direction can be obtained and a capacity of the space can be secured, which sufficiently improves the strength. Besides, by joining the rear rear-fender bracket 304 to the rear rear-fender 300 by screwing them together with the license plate mounting bracket 307, the increase in the number of parts is prevented.

Note that it is needless to say that, although the rear fender is formed by including the front rear fender 200 and the rear rear-fender 300 in the present embodiment, the present invention can also be applied to a motorcycle having no front rear fender 200 and having the rear rear-fender 300 that is directly fixed to the vehicle body frame, for instance.

According to the present invention, it is possible to sufficiently secure a rigidity of a rear fender without complicating a structure of parts. Further, it is possible to reduce the number of mounting parts while sufficiently securing the rigidity of the rear fender.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A rear fender structure for motorcycle, comprising:
   a box-shaped rear fender having an upper end surface mounted to a rear portion of a vehicle body of the motorcycle, extending rearward and downward, covering a rear wheel from upward and rearward, and coupled to the rear portion of the vehicle body, and side walls having a substantially inverted triangular shape when viewed from a vehicle side and extending rearward and downward from both sides of the upper end surface; and
   a plate-shaped rear fender bracket integrally coupled to at least an upper portion and a lower portion of said rear fender to form a closed space with an internal surface of said rear fender, having an inverted triangular shape when viewed from a vehicle side in which a space is gradually narrowed from an upper portion to a lower portion, wherein
   an opening is formed on an external surface on an upper side of said rear fender,
   a lighting portion of a rear combination lamp is faced to the outside from the opening,
   at least a socket and a housing of the rear combination lamp are disposed in the closed space between said rear fender and said rear fender bracket, and
   an opening is formed on said rear fender bracket, and the socket of the rear combination lamp is exposed to the outside from the opening on the rear fender bracket.

2. The rear fender structure for motorcycle according to claim 1, further comprising:
   a cover member that covers the opening formed on said rear fender bracket in an openable/closable manner.

3. The rear fender structure for motorcycle according to claim 1, wherein
   a key cylinder of a seat lock mechanism disposed in vicinity of the rear portion of the vehicle body is disposed in the closed space between said rear fender and said rear fender bracket, and a seat lock cable of the seat lock mechanism is connected to the key cylinder through the closed space.

4. A motorcycle, comprising:
   said rear fender structure for motorcycle according to claim 1.

* * * * *